US005742321A

United States Patent [19]

Frederic

[11] Patent Number: 5,742,321

[45] Date of Patent: Apr. 21, 1998

[54] METHOD AND APPARATUS FOR CONTROLLING THE HEAD OF A THERMAL LINE PRINTER

[76] Inventor: Alain Frederic, 20 rue du Pays de France, 95000 Cergy, France

[21] Appl. No.: 285,950

[22] Filed: Aug. 4, 1994

[30] Foreign Application Priority Data

Aug. 4, 1993 [FR] France .................................. 93 09613

[51] Int. Cl.$^6$ .............................. B41J 2/35; G01D 15/16

[52] U.S. Cl. ............................................................ 347/211

[58] Field of Search ..................................... 347/180, 181, 347/182, 183, 195, 211; 400/120.05, 120.06

[56] References Cited

U.S. PATENT DOCUMENTS

| | | | |
|---|---|---|---|
| 4,638,329 | 1/1987 | Nakayama et al. | 347/181 |
| 4,873,535 | 10/1989 | Sasaki | 347/182 |
| 5,072,237 | 12/1991 | Takaoka | 347/181 |
| 5,099,258 | 3/1992 | Hirayama | 347/181 |

FOREIGN PATENT DOCUMENTS

| | | |
|---|---|---|
| 0018762 | 11/1980 | European Pat. Off. . |
| 2459591 | 7/1981 | France . |
| WO9200195 | 10/1992 | WIPO . |

*Primary Examiner*—N. Le
*Assistant Examiner*—L. Anderson
*Attorney, Agent, or Firm*—Graham & James LLP

[57] ABSTRACT

Method for controlling a line head of a thermal printing apparatus in which heating elements (2; 102) of the head (1; 101) are activated for printing a line of points on a printing medium, wherein the positions of the heating elements (2; 102) to be activated are stored in memory, a predetermined number (N) thereof are selected, while locating and storing the positions thereof, and activated, and, after deactivation, the preceding step is repeated for points to be printed with positions not yet located, until all the points of the line to be printed have been printed, before advancing the printing medium.

6 Claims, 5 Drawing Sheets

METHOD AND APPARATUS FOR CONTROLLING THE HEAD OF A THERMAL LINE PRINTER

BACKGROUND OF THE INVENTION

Thermal printing apparatus such as a facsimile machine, for example, includes a printing head in which a plurality of resistive heating elements can be activated to print a line.

Each heating element is connected to a supply source and individually controlled in order to print or not to print a black point. In a facsimile machine, each heating element is generally supplied with 24 volts and has a resistance of approximately 3000 ohms.

In view of their number, the total current consumption of the heating elements would be very high if they were activated simultaneously. For example, approximately 1800 elements would consume approximately 15 amps. This is why the heating elements in many facsimile machines are grouped in blocks, four blocks of approximately 450 heating elements each, for example, and each block is activated successively.

The maximum current the power supply needs to provide for printing a block of black points is thereby limited to approximately 3.5 amps. Such a power supply is still too bulky and expensive, nevertheless.

The present invention aims to reduce the maximum supply current.

SUMMARY OF THE INVENTION

A method for controlling the head of a thermal line-printing apparatus in accordance with the present invention includes a head in which heating elements are activated for printing a line of points on a printing medium, wherein:

- the positions of the heating elements to be activated are stored in memory;
- a predetermined number of the heating elements are selected, while locating and storing the positions thereof, and activated;
- and, after deactivation, the preceding step is repeated for points to be printed with positions not yet located
- until all the points of the line to be printed have been printed, before advancing the printing medium.

It is thus possible to choose the maximum current of the supply by a suitable choice of the number of heating elements activated simultaneously. It will be noted that this number may be greatly limited without thereby restricting the average printing speed of a line, since all the heating elements selected are activated at a time. In other words, the heating elements are no longer activated by blocks of predetermined size, as in the printing apparatus of the prior art, but by blocks of variable size with a predetermined maximum number of heating elements activated and with an unfixed and variable number of inactive heating elements. Thus, instead of reserving printing durations for blocks of predetermined size, it is the information to be printed, that is to say the presence of black points, which defines the size of the blocks and thus makes it possible to optimize the printing by "ignoring" the presence of blanks.

Preferably, the heating elements are grouped in blocks of predetermined size and, if the number of heating elements to be activated in a block is less than said predetermined number, before activation, selection is carried out from among the heating elements to be activated in another block.

The invention also relates to a thermal printing apparatus for implementing the method of the invention, including a line head comprising a plurality of heating elements, an activation control register for the heating elements and a transfer register designed to receive activation control data from memory means and transfer it into the control register, and sequencer means for controlling the transfer register of the head. The sequencer means is designed to count the number of heating elements activated, in order to control means for storing in memory addresses of the positions of said heating elements and to oversee the control data memory means, and to inhibit the transfer register if said number exceeds a threshold number.

BRIEF DESCRIPTION OF THE DRAWINGS

The invention will be better understood with the aid of the following description of two preferred embodiments of the thermal line-printing apparatus in accordance with the invention, with reference to the attached drawing, in which.

DETAILED DESCRIPTION OF THE PREFERRED EMBODIMENTS

Figure 1:
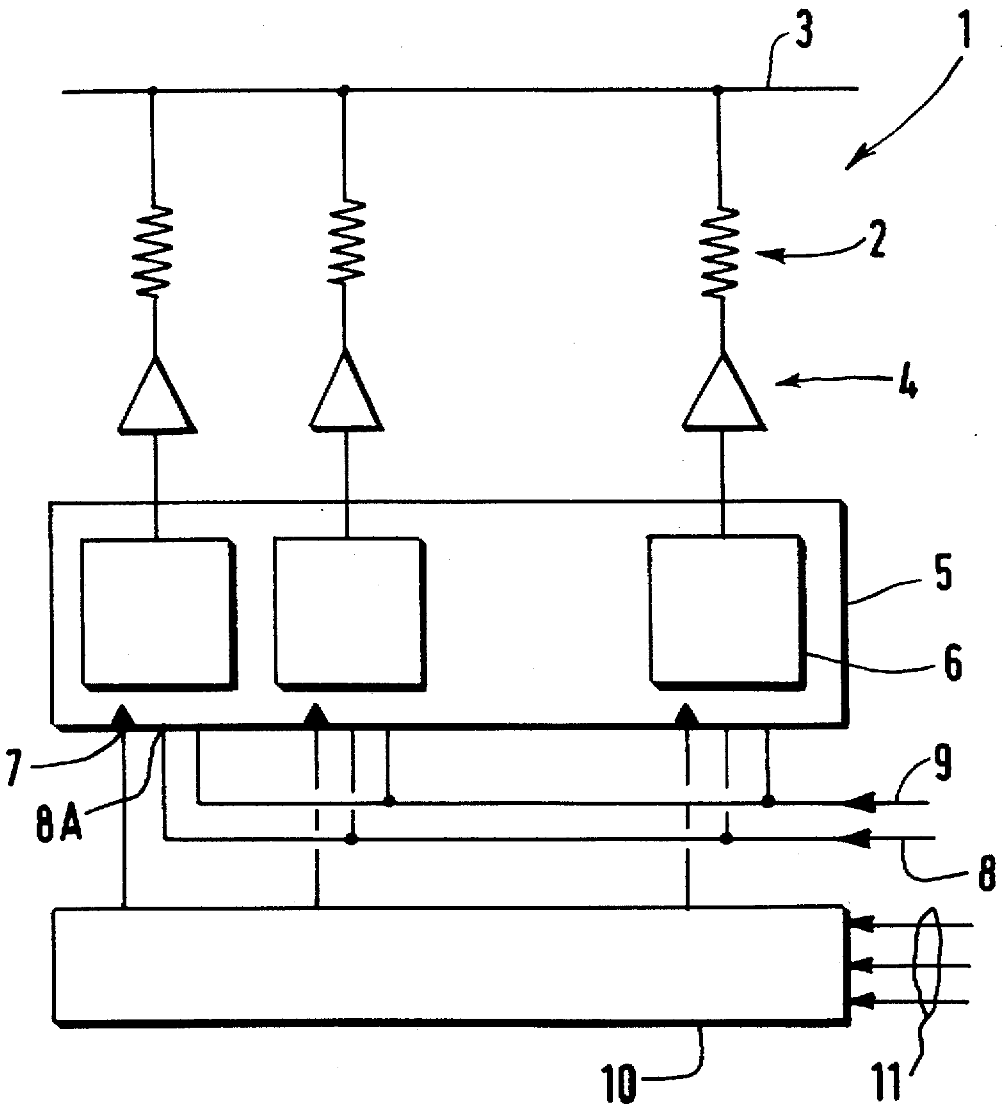
FIG. 1 is a block diagram of a parallel-loading printing head in the first embodiment.

The thermal printing apparatus in accordance with the invention includes, in its first embodiment, a thermal head 1 represented in FIG. 1, in which a row of 1728 printing heating elements, given the overall reference 2, interacts with a thermal-transfer printing ink ribbon, not shown, applied onto a medium to be printed consisting of paper and driven in advance against the head 1. Printing elements 2 having a resistance of 3000 ohms are connected to a +24-volt supply line 3 and controlled by individual operational amplifiers 4 which operate in inverter mode and supply the 8 milliamps passing through each printing element 2 while activated. The amplifiers 4 are each controlled by an individual activation bit stored in a memory point 6, here of a "D"-type flip-flop, of a printing control buffer register 5 having parallel inputs and outputs, and including a sequence of 1728 such memory locations 6. Demultiplexer circuit 10 includes eleven address inputs 11, and 1728 outputs connected to 1728 respective clock inputs 7 belonging to the 1728 respective memory locations 6.

The 1728 memory locations 6 respectively include 1728 data bit inputs 8A connected to a bus 8. An input 9 is here provided, connected to all the memory locations 6, allowing simultaneous resetting of them all, that is to say forcing them into one and the same predetermined state, here a logic level 0 referred to as inactive, for which the heating elements 2 are not supplied with current through the amplifiers 4.

The "D"-type flip-flops of the memory locations 6 may be TTL or CMOS integrated circuits, for example type 7474, while the demultiplexer 10 similarly may have several integrated circuits of type 74154 or 74HC154 with logic for selecting one of them in response to an address input providing a validation input, the corresponding outputs of the 74154 or 74HC154 circuit being then unused. It would have been possible to provide JK-type divide-by-two flip-flops, rather than "D" flip-flops, thereby eliminating the need for data bus 8, since each time such a divider flip-flop was addressed it would change state.

The integrated circuits noted above are available from TEXAS INC. or MOTOROLA, INC.

Figures 2A, 2B, 2C, 2D, 2E:
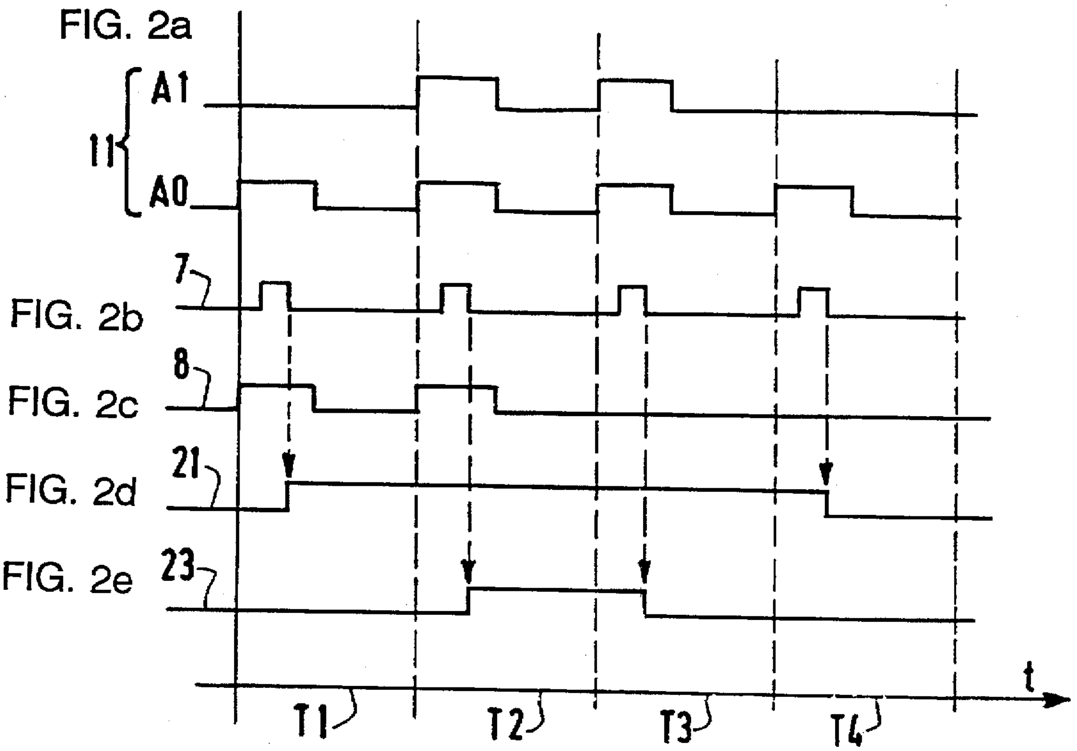
FIG. 2 is a diagram of the times of control signals of the printing head in FIG. 1.

In order to activate a heating element 2, the address of a corresponding location in the row is applied briefly to the address inputs 11, the bus 8 having previously been set to the logic level 1 (FIG. 2). The output of the demultiplexer 10 connected to the clock input 7 of the memory location 6 of the heating element 2 in question supplies a pulse for as long as the address is applied to the address inputs 11. This opens a gate, not shown, for individual activation of a heating element 2, which reads the logic level of the data bus 8 and stores a bit having the logic level 1 present on the data bus 8 in the memory location 6 in question.

The deactivation of a memory location 6 takes place in similar manner, the bus 8 then being at logic level 0.

The bit contained in each memory location 6 is thus an activation bit for the heating elements 2, which can have two states: an active state, here the logic level 1, and an inactive state, here the logic level 0.

Thus, in FIG. 2, which is a temporal diagram of the signals noted above, the memory location 6 having the address "one" is addressed briefly within a period T1 of a sequence Ti, where "i" is an integer from 1 to P, by setting the least significant address bit A0 applied to the address inputs 11 to logic level "1", while other bits, not all of which are shown, are at logic level "0", which generates a pulse on the clock input 7 of the memory location 6 with address "one", the logic level or state of which is represented by a signal 21.

During the following period T2 another memory location 6 is addressed, here having the address "three", while the two least-significant address bits, A0 and A1, change to logic level "1" in order to provide the binary address "11", a decimal value of three. A signal 23 represents the logic level of the bit contained in the memory location with address "three". The initial states of the memory locations 6 have here been assumed to be the "0" state.

In this example, the memory location having the address "three" returns to the 0 state during the period T3, while the memory location with address "one" returns to the 0 state in period T4. Thus simultaneous or alternating control of several memory locations 6 is permitted by the division of time t into segments or periods "Ti".

It will be understood that, for the purpose of clarity, the control pulses appear to return to the "0" state between periods T1–T4 although, in practice, the data bus 8 remains at the same level during each period T1–T4 and is sampled by the active edge of the clock signal 7, here the negative-going edge. Because of this, the periods T1–T4 are limited to a few tens of nanoseconds, which makes it possible to control all the memory locations 6 in a period much shorter than the 10 milliseconds anticipated by line printing standards.

Figure 3:
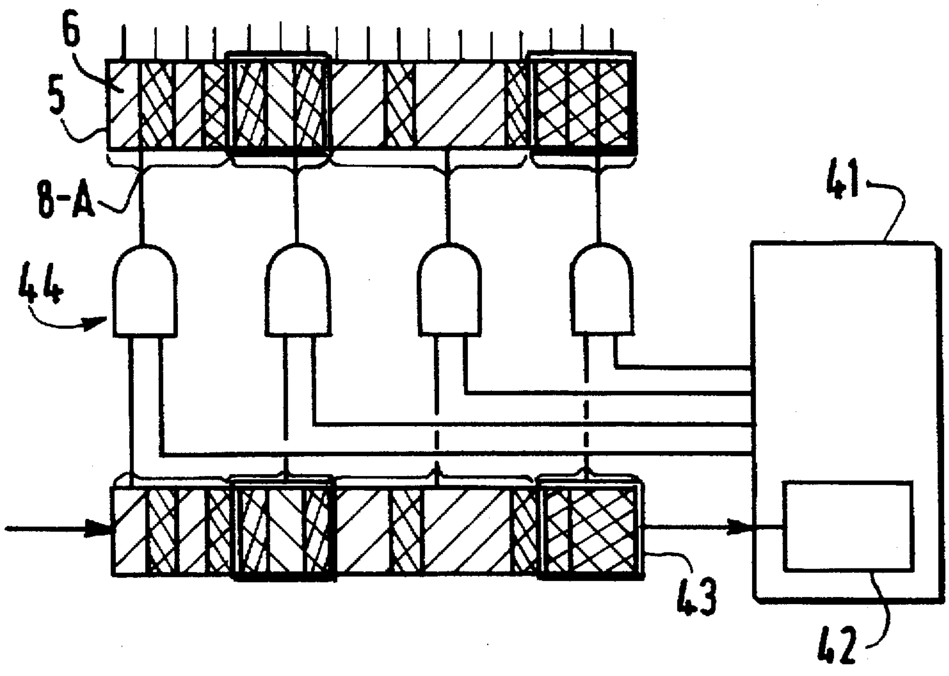
FIG. 3 is a simplified diagram of the above printing head and of control logic for this head.

FIG. 3 schematically illustrates the manner in which the printing register 5 is loaded. The printing register 5, as shown, includes 1728 data inputs 8A for memory locations 6 which are connected through gates 44 to an equal number of outputs from an input register 43 containing a sequence of binary signals representing stored numbers, codes in this example, representing gray intensities of the respective locations in a line to be printed.

A control circuit 41 is connected by means of a read circuit 42 in the circuit 41 to the input register 43 and controls the opening of a given number of gates 44 having given positions. This number of gates is a function of the coded numbers read from the register 43, as explained further on.

The hatched zones indicate blocks of bits transferred simultaneously. The position of the hatched zones of register 43 corresponds to that of the hatched zones of the printing register 5. The presence of numbers different from zero, indicating grays, are marked by doubly hatched blocks. A bit with the same address in the printing register 5 therefore corresponds to a coded number.

Figure 4:
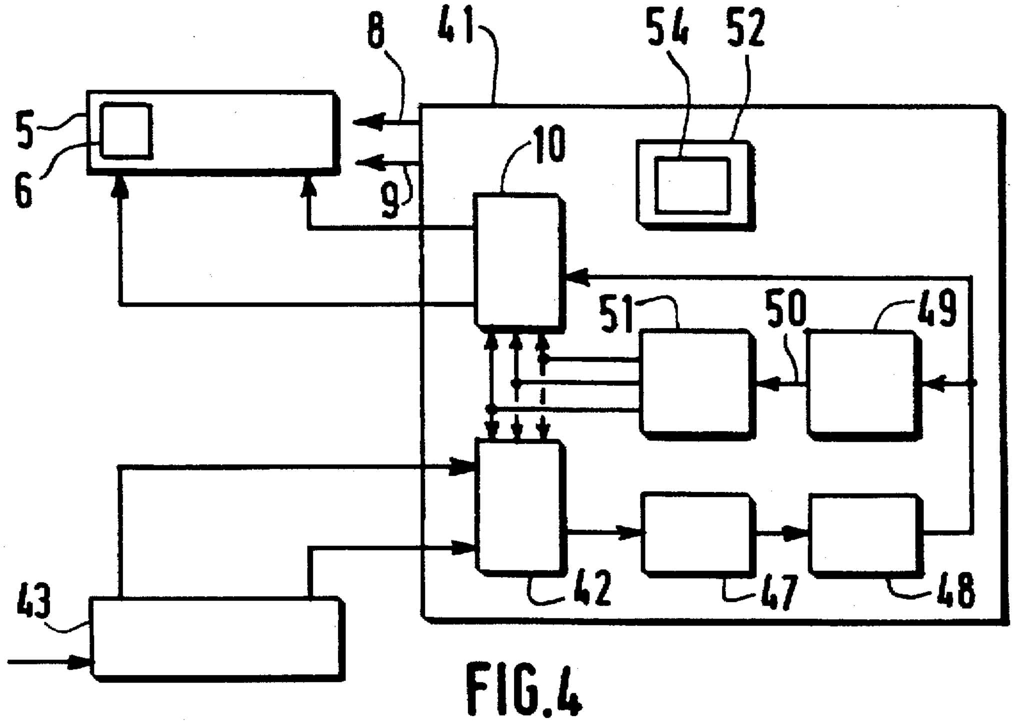
FIG. 4 is a more detailed diagram than that in FIG. 3.

FIG. 4 shows the diagram of FIG. 3 in more detail. The read circuit 42 is a multiplexer connected to the M outputs of the input register 43, where M=1728 times the number of bits in each coded number.

Since the numbers of the register 43 are coded in this example, the output of the multiplexer 42 is connected to a decoder circuit 47 which converts each coded number received into a decoded number of predetermined length including at its head a number bits set to the "1" state that is proportional to the intensity of the gray defined by the corresponding coded number. These uncoded numbers are stored in a memory 48, a buffer memory that accomodates bits for several lines which are the control data for activating the heating elements 6. For clarity's sake the memory 48 is not shown in FIG. 3. It would, however, with the transcoder circuit 47, be inserted between the outputs of the input register 43 and the gates 44.

The output of the memory 48 also activates a counter 49 which detects the presence of activated bits in the "1" state and emits a stop signal 50 when it reaches a predetermined threshold number N. The signal 50 has the effect of stopping a common address pointer register 51 which drives the multiplexer 42 and the demultiplexer 10 connected at output of the printing register 5, here shown as integrated into the circuit 41.

After filling the memory 48, a sequencer circuit 52 forces the pointer 51 to begin at a given address having the value "one", and starts reading the first bits of each uncoded word from the memory 48. If the bit read is in the "1" state, this "1" is recopied into the memory location 6 having the corresponding address by means of the demultiplexer 10 and, in the apparatus considered here that uses D-type flip-flops in the printing register 5, by activation of the bus 8. After N such recopies, a decoder or comparator integrated at the output of the counter 49 emits the stop signal 50, which stops any further transmission of "1"-state data bits to the printing register 5, and the address "AS" of the last memory location 6 having a "1"-state data bit is stored by the sequencer circuit 52 in an address memory 54, which here belongs to the sequencer circuit 52. The circuit 52 next resets the counter 49 to "one" in order to start a new cycle, for the second bits of the uncoded numbers in the memory 48, and then sends a command to deactivate the memory locations 6 for which the second bit of the uncoded number is in the "0" state, from the address "one" to the address "AS".

Starting subsequent cycles from the address "one", permits processing subsequent bits of the same uncoded numbers which, in the end, ensures deactivation of the heating elements 6 with addresses between "one" and "AS". Other such sets of cycles relative to the address "AS" stored by the sequencer circuit 52, the first starting at the address "AS+1", make it possible to control successive blocks of variable size (FIG. 3) that include sets of N memory locations 6 in the activated "1" state, shown in FIG. 3, separated from each other by an arbitrary number of memory locations 6 in the inactive state. Writing is thus carried out by the demultiplexer 10 under the control of the addressing means (42, 49, 54), since it is the stop signal 50 of the counter 49 which determines the last address in each block of bits.

The maximum instantaneous current is here limited to N times 8 milliamps.

After writing the last black point in the line, the bits of the subsequent line to be printed are read from the input register 43, in order to start printing again once the medium to be printed is advanced.

In summary, in order to print a line of points on the printing medium, the heating elements 2 of the head 1 are activated by carrying out the following steps:

the positions of the heating elements 2 to be activated are stored in a memory 48, a predetermined number N thereof are selected and activated, while locating and storing the positions thereof, and, after deactivation, the preceding step is repeated for points to be printed having positions not yet located, until all the points of the line to be printed have been printed, before advancing the printing medium.

Figure 5:
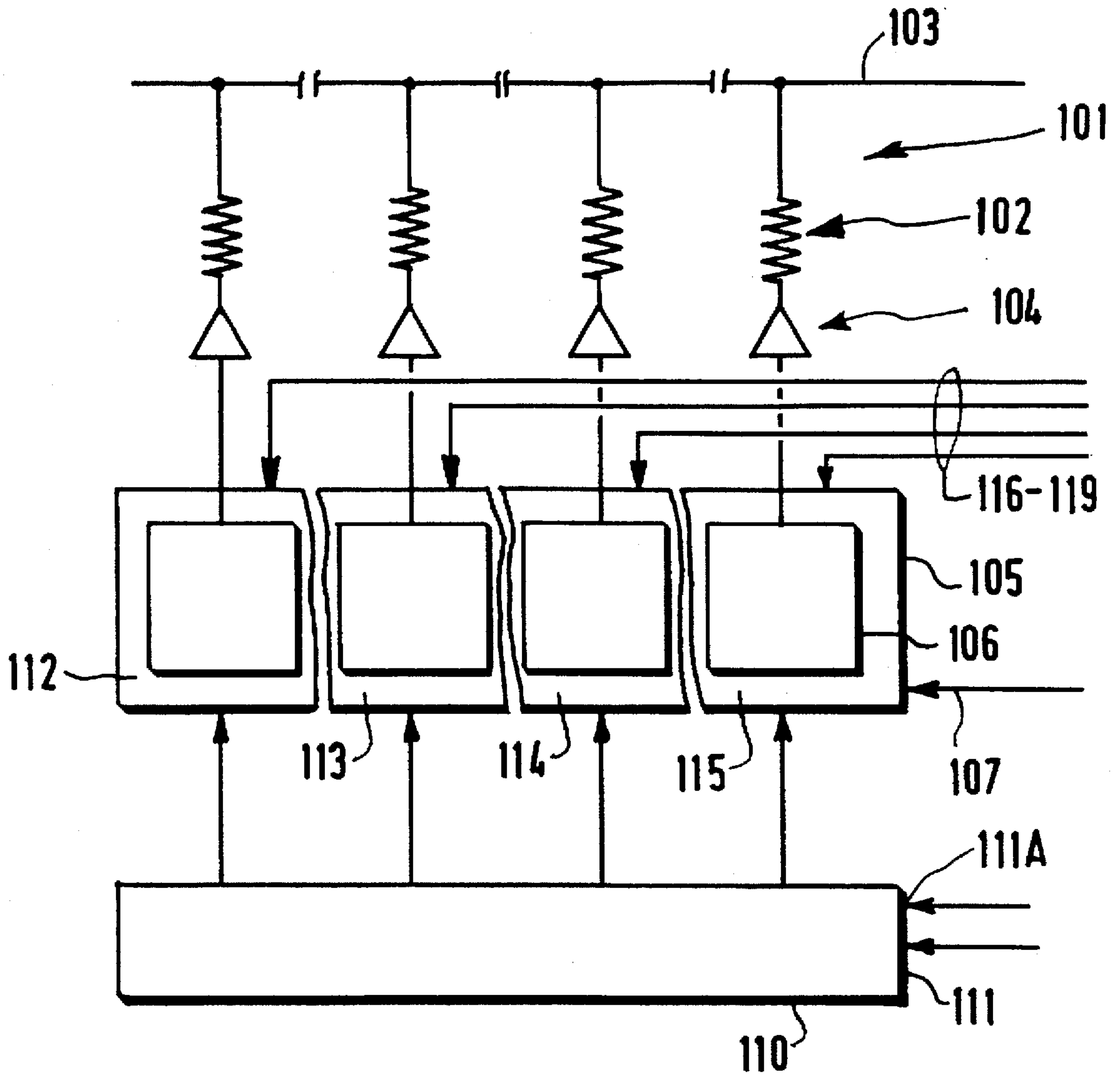
FIG. 5 is a block diagram of a series-loading printing head in the second embodiment.
Figure 6:
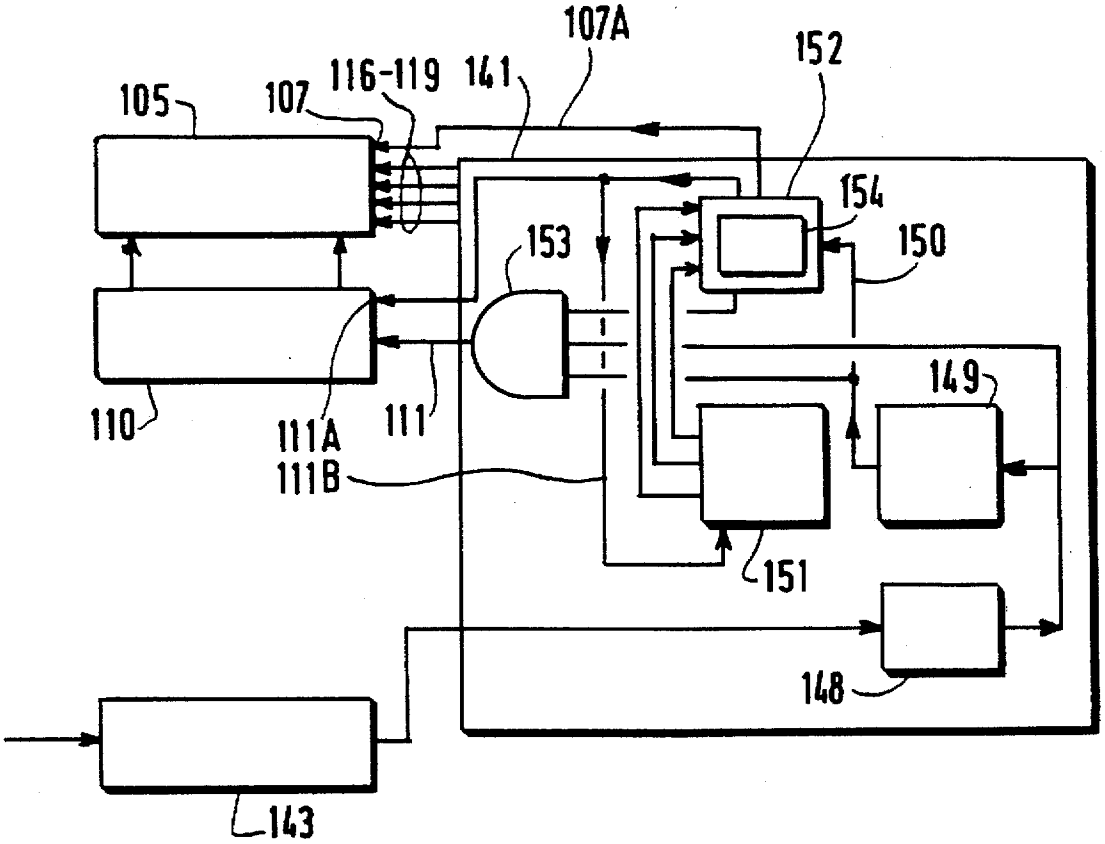
FIG. 6 is a block diagram of the printing head in FIG. 5 and of control logic for this head.

In a second embodiment, shown in FIGS. 5 to 6, elements similar or identical to those in the first embodiment bear the same references, preceded by a hundreds digit 1 and, in some cases, by a tens digit 1.

The printing head 101 is a commercial head and the demultiplexer 10 is replaced, in this second embodiment, by a shift register 110, here integrated with the head 101, that serially receives the 1728 activation bits at its data input 111 at the rate of a clock signal 111B applied to serial clock input 111A.

The buffer register 105 is logically divided into four equal blocks 112–115 of 432 memory locations 106, each including a validation input for the outputs of the memory locations 106, which validation input is connected individually to a validation control link 116–119. A clock input 107 controls the storing in all the memory locations 106. The validation control links 116–119 enable the output of the bits contained in the blocks 112–115 and, in the absence of validation, force the corresponding outputs connected to the amplifiers 104 to the logic level "0" which corresponds to an absence of the activation command for the heating elements 102.

The head 101 is controlled by a circuit 141 similar to the circuit 41 and connected to the output of an input shift register 143. The input register 143 receives the 1728 bits, which directly represent the black or white points of a line to be printed in this example, from an external source and transmit them to the memory 148.

For the transfer of the 1728 bits to the series printing register 110, the principle of operation of the circuit 141 is similar to that of circuit 41, with the difference that 1728 bits are transferred at a time, including the N bits that are in the active state. In order to do this, the counter 151 receives from the sequencer 153 the clock signal 111B which is also applied to the shift register 110, as indicated. The counter 151 is connected at output to the sequencer 152, and systematically counts from 1 to 1728 without control by the stop signal 150.

The limit addresses of the zones of the line to be printed, the positions of which have already been processed by the sequencer 152, are stored in a memory 154 of the sequencer 152 which thus acts as a mask for determining the remaining zones to be processed.

A gate 153, here an AND gate, connects the output of the memory 148 to the input 111 of the shift register 110 and includes two other inputs for control. The first control input is connected to the sequencer 152 and the second control input receives a signal 150, which is also applied to the sequencer 152 and is stored in the counter 149 until the latter is reset, in order to keep the gate 153 blocked.

The circuit 141 operates as follows.

The 1728 bits for a line are transferred from the memory 148 to the input 111 of the shift register 110 through the gate 153 at the rate of the clock signal 111B. When the counter 149 reaches the value N, the signal 150 blocks the gate 153 by setting its output to the logic level "0" until the end of the transfer of the 1728 bits, which inhibits transmission of an excessive number of activation bits at level "1". The signal 150, which causes inhibition of the transfer of activation command bits in state "1", also controls the sequencer 152 which stores the address AS in the memory 154.

The heating elements 102 are thus activated individually by a series transfer of activation commands and the respective commands for the heating elements 102 which are to remain inactive are forced to an inactive "0" state before being transferred.

After the counter 151 has reached the value 1728, the sequencer 152 initiates parallel loading of bits from the register 110 into the buffer memory 105, via a link 107A connected to the input 107 of the buffer register 105 when the length of time necessary for printing the preceding points has elapsed. For subsequent printing, the sequencer 153 activates the four validation control links 116–119. Here it is done simultaneously. Modified control of these links is described further on.

After the previous transfer of 1728 bits including N bits in the "1" state, another cycle is carried out for the N next activation bits. The counter 151 counts again from 1 to 1728. The sequencer 152 opens the gate 153 starting only at the address AS+1 calculated using contents of the memory 154, and the signal 150 subsequently closes it, as already explained.

Thus, the shift register 110 receives activation data from the memory 148 and transfers it into the control register 105. The sequencer 152 controls the shift register 110 and counts the number of heating elements 102 activated using the counter 149, to control its memory 154 where the addresses of positions of the heating elements 102 are stored and to manage the data memory 148. The sequencer 152 also inhibits the transfer register 110 if the number of activated heating elements exceeds the threshold N.

In an alternative embodiment, where the four validation control links 116–119 are separate, the counter 149 may count the activation bits transferred to the register 110 for each block 112–115. In this case N activation bits would be transferred at a time to the shift register 110 and then to the buffer register 105, if there are that many. The sequencer 153 would then, in any desired order, successively activate the validation control links 116–119. The number of transfers would thus be reduced by a factor of 4. In the event that fewer than N activation bits remain to be transferred to a block 112–115, provision may be made for shifting these bits to "overflow" into one or more other blocks. For example, if there was overflow between two of the blocks 112–115 having individual validation control links 116–119 the two blocks would then be activated simultaneously for printing.

In other words, the heating elements 102 are grouped into blocks of predetermined size and, if the number of heating elements 102 to be activated in a block is less than the predetermined number N, before that block is activated elements to be activated are selected from among the heating elements 102 in another block.

The shift register 110, with the gate 153, thus permits a transfer of line portions with respective predetermined sizes and positions and transmits blank line portions to the printing control buffer register 105, in the event of inhibition by the sequencer 152.

I claim:

1. Method for controlling a line head of a thermal printing apparatus in which heating elements (2; 102) of the head (1; 101) are activated for printing a line of points on a printing medium, comprising the steps of:

(a) storing positions of the heating elements (2; 102) to be activated in memory, (b) selecting a predetermined single number N of the heating elements, while locating and storing positions thereof, and activating the selected heating elements for printing and then deactivating them, and, (c) after deactivation, the selecting step is repeated for points to be printed with positions not yet located, until all the points of the line to be printed have been printed, before advancing the printing medium.

2. Method for controlling a line head of a thermal printing apparatus in which heating elements (2; 102) of the head (1; 101) are activated for printing a line of points on a printing medium, comprising the steps of:

(a) storing positions of the heating elements (2; 102) to be activated in memory, (b) selecting a predetermined single number N of the heating elements, while locating and storing positions thereof, and activating the selected heating elements for printing and then deactivating them, and, c) after deactivation, the selecting step is repeated for points to be printed with positions not yet located, until all the points of the line to be printed have been printed, before advancing the printing medium, wherein the heating elements (2; 102) are grouped in blocks (112–115) of predetermined size and, if a number of heating elements (2; 102) to be activated in a block is less than said predetermined number (N), before activation, selection is carried out from among the heating elements (2; 102) to be activated in another block (112–115).

3. The method as claimed in claim 1, wherein the heating elements (2; 102) are activated individually by a series transfer of activation commands and, for the heating elements (2; 102) which are to remain inactive, the individual commands are forced to an inactive state before being transferred to the heating elements which are to remain inactive.

4. A thermal printing apparatus having means for controlling a line head thereof, said line head having heating elements (2; 102) which are activated for printing a line of points on a printing medium, said line head (1; 101) comprising; an activation control register (5; 105 for the elements (2; 102); control data memory means (48; 148) for containing activation control data; a transfer (10; 110) adapted to receive activation control data from the control data means (48; 148) and to transfer the activation control data into the control register (5, 105); and sequencer means (51, 52; 151, 152 153), for counting a number of heat elements (2; 102) said sequencer means activation is commanded the control register (5, 105) from activation control data from the means (48; 148) in order to control means (54; 154) for storing in memory, addresses of positions of said heating elements (2; 102) and for overseeing the control data memory means (48; 148), to restrict the transfer register (10; 110) if said number exceeds a threshold N.

5. The apparatus as claimed in claim 4, wherein the transfer register (11) is adapted to transfer line portions with predetermined respective sizes and positions and, in the event of inhibition by the sequencer means (152, 153, 154), to transmit white line portions to control register (110).

6. The apparatus as claimed in claim 4, wherein the memory means (48; 148) is adapted to include a buffer for storing activation control data relating to several lines.

* * * * *